US011975329B2

(12) United States Patent
Liu et al.

(10) Patent No.: US 11,975,329 B2
(45) Date of Patent: May 7, 2024

(54) INCUBATION SYSTEM HAVING ROTARY MECHANISM

(71) Applicant: LifeOS Genomics Corporation, Grand Cayman (KY)

(72) Inventors: Timothy Z. Liu, Fremont, CA (US); Hung-Wen Chang, Hsinchu (TW)

(73) Assignee: LifeOS Genomics Corporation, Grand Cayman (KY)

(*) Notice: Subject to any disclaimer, the term of this patent is extended or adjusted under 35 U.S.C. 154(b) by 128 days.

(21) Appl. No.: 17/469,382

(22) Filed: Sep. 8, 2021

(65) Prior Publication Data

US 2021/0402409 A1 Dec. 30, 2021

Related U.S. Application Data

(63) Continuation of application No. 15/585,756, filed on May 3, 2017, now abandoned.

(51) Int. Cl.
*B01L 7/00* (2006.01)
*B01L 99/00* (2010.01)

(52) U.S. Cl.
CPC ......... *B01L 7/525* (2013.01); *B01L 2200/026* (2013.01); *B01L 2200/0647* (2013.01); *B01L 2300/045* (2013.01); *B01L 2300/046* (2013.01); *B01L 2300/0627* (2013.01); *B01L 2300/08* (2013.01); *B01L 2300/1805* (2013.01); *B01L 2300/1822* (2013.01); *B01L 2300/1827* (2013.01); *B01L 2300/1838* (2013.01); *B01L 2300/1883* (2013.01); *B01L 2400/043* (2013.01)

(58) Field of Classification Search
CPC ....... B01L 2200/026; B01L 2200/0647; B01L 2300/045; B01L 2300/046; B01L 2300/0627; B01L 2300/08; B01L 2300/1805; B01L 2300/1822; B01L 2300/1827; B01L 2300/1838; B01L 2300/1883; B01L 2400/043; B01L 7/525
See application file for complete search history.

(56) References Cited

U.S. PATENT DOCUMENTS

| | | | |
|---|---|---|---|
| 2005/0009101 | A1 | 1/2005 | Blackburn |
| 2013/0210081 | A1 | 8/2013 | Koeda |
| 2017/0114316 | A1 | 4/2017 | Newstrom et al. |

FOREIGN PATENT DOCUMENTS

| | | | |
|---|---|---|---|
| CN | 202083636 | U | 12/2011 |
| CN | 103228360 | A | 7/2013 |
| CN | 104487592 | A | 4/2015 |
| CN | 204385208 | U | 6/2015 |
| CN | 104755938 | A | 7/2015 |
| WO | 2017059273 | A1 | 4/2017 |

*Primary Examiner* — Lydia Edwards

(57) ABSTRACT

An incubation system includes an actuator, a platform, an incubation lid, and a dispenser. The actuator includes a motion disc and a shaft connected to the motion disc. The shaft extends away from the motion disc. The platform is connected to the shaft of the actuator in a manner allowing movement transmission. The platform has a through hole and a thermal conductive plate. One end of the through hole is sealed by the thermal conductive plate. The incubation lid is movably disposed over the platform. The platform is thermal insulating. The incubation lid has an opening allowing fluid communication, and the dispenser suspends over the thermal conductive plate of the platform.

14 Claims, 12 Drawing Sheets

1200

1200

INCUBATION SYSTEM HAVING ROTARY MECHANISM

CROSS-REFERENCE TO RELATED APPLICATION

The present application is a continuation application of the U.S. application Ser. No. 15/585,756, filed on May 3, 2017, all of which are herein incorporated by reference in their entireties.

BACKGROUND

Field of Invention

The present invention relates to an incubation system for biological or chemical analytes. More particularly, the present invention relates to an incubation system having rotary mechanism.

Description of Related Art

Polymerase chain reaction (PCR) has been widely used in many areas of nucleic acid analysis for decades. PCR requires careful temperature control in different stages. For example, double stranded DNA template is denatured at approximately 95° C. Then, the temperature is lowered to approximately 40-70° C. At this temperature, short synthetic oligonucleotide primers hybridize to their complementary sequences rendered into a single stranded state in the previous heating step. Following that, the temperature can be increased to approximately 72° C. At this temperature, a heat stable DNA polymerase extends the primers, thus creating a complementary copy of the original single stranded template DNA. By repeating the temperature cycle many times, the amount of template DNA is, if the amplification efficiency is deal, doubled at each cycle. In addition to PCR, many if not all biological and chemical reactions require a certain temperature to occur in a predictable manner. Examples of such reactions with critical temperature requirements include immunocomplex formation, rolling circle amplification (RCA), and nearly all other enzymatic and chemical reactions.

A number of solutions exist for controlling a reaction temperature. For example, in PCR, the reaction vessels are very often placed in a block of metal, the temperature of which is changed periodically. Alternatively, the reaction solution can be repeatedly passed through different temperature zones in a reaction channel or tubing to achieve temperature cycling. There is often a need for material introduction into or removal from the reaction vessels while under temperature regulation. A device for allowing liquid communication with the reaction vessels that are placed in a temperature regulating device is disclosed in the application.

SUMMARY

The instant disclosure provides an incubation device includes an actuator, a platform, and an incubation lid. The actuator is mounted on an actuator support leg. The actuator includes a motion disc and a shaft connected to the motion disc and extending away from the actuator support leg. The platform is connected to the shaft of the actuator in a manner allowing movement transmission. The platform is formed with a through hole, and one end of the through hole is sealed by a thermal conductive plate. The incubation lid is slidably disposed over the platform.

The instant disclosure also provides an incubation system. The incubation system includes an actuator, a platform, an incubation lid, and a dispenser. The actuator is mounted on an actuator support leg. The actuator includes a motion disc and a shaft connected to the motion disc and extending away from the actuator support leg. The platform is connected to the shaft of the actuator in a manner allowing movement transmission. The platform is formed with a through hole, and one end of the through hole is sealed by a thermal conductive plate. The incubation lid is slidably disposed over the platform. The incubation lid has a opening. The dispenser suspends over the thermal conductive plate of the platform. The opening of the incubation lid allows fluid communication from the dispenser.

The incubation device allows rapid thermal control through thermal conductive plate and thermal insulating platform that surrounds the thermal conductive plate. The incubation device also inputs motion such as rotation to allow even solution distribution in the reaction vessels. The conditions of the analytes can be easily detected from the opened opening of the incubation lid.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
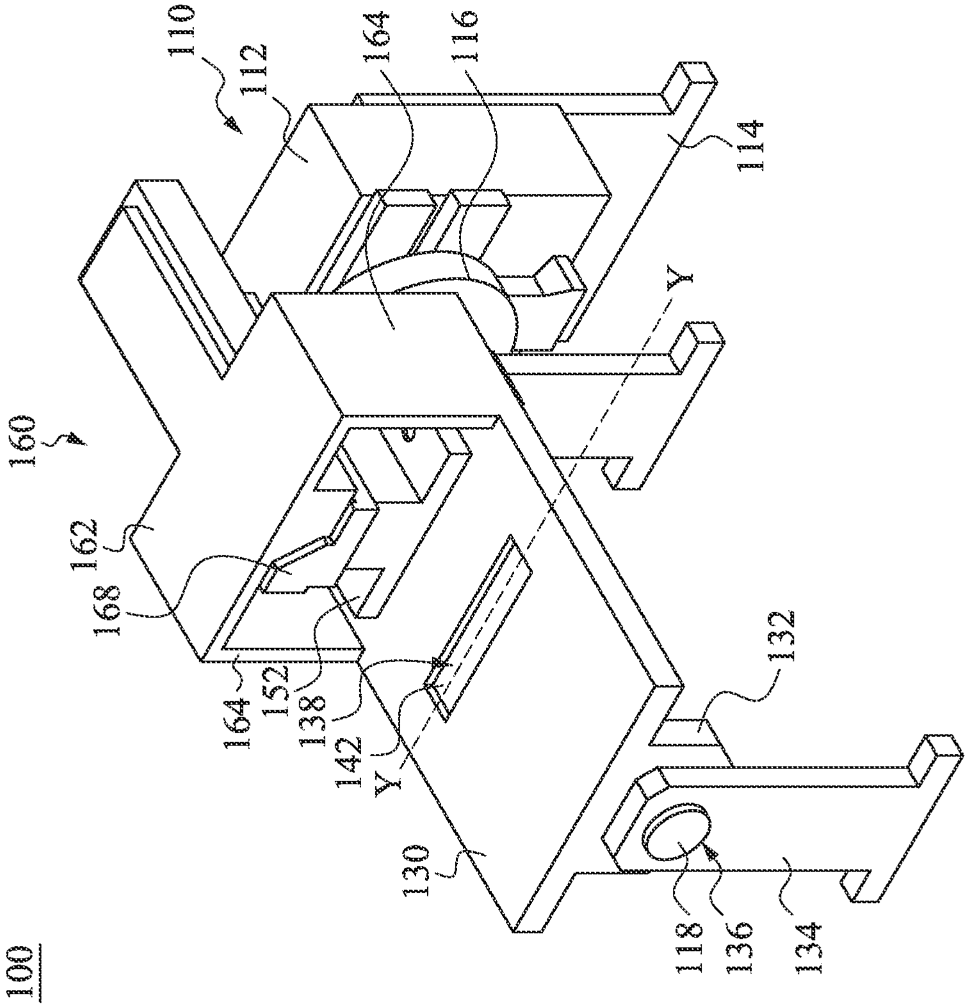
FIG. 1 is a perspective view illustrating an incubation device in accordance with an embodiment of the instant disclosure.

Reference will now be made in detail to the present embodiments of the invention, examples of which are illustrated in the accompanying drawings. Wherever possible, the same reference numbers are used in the drawings and the description to refer to the same or like parts.

Attention is now invited to FIG. 1. An incubation device 100 is provided. The incubation device 100 includes an actuator 110, a platform 132, and an incubation lid 152. In some embodiments, the actuator 110 includes an actuator housing 112 that contains some of the mechanical components of the actuator 110. The actuator housing 112 is mounted on an actuator support leg 114 and slightly suspends from a surface as shown in FIG. 1. The actuator 110 also includes a motion disc 116 that is fastened to the actuator housing 112. The motion disc 116 may be hidden in the actuator housing 112, or alternatively, mounted on the sidewalls of the actuator housing 112 as shown in FIG. 1. The motion disc 116 may go clockwise and anti-clockwise direction to a certain degree. The actuator 110 may be a stepper motor, electric piston motor, pneumatic motor, electric motor, or an electromagnetic motor, and the instant disclosure is not limited thereto.

Figure 2:
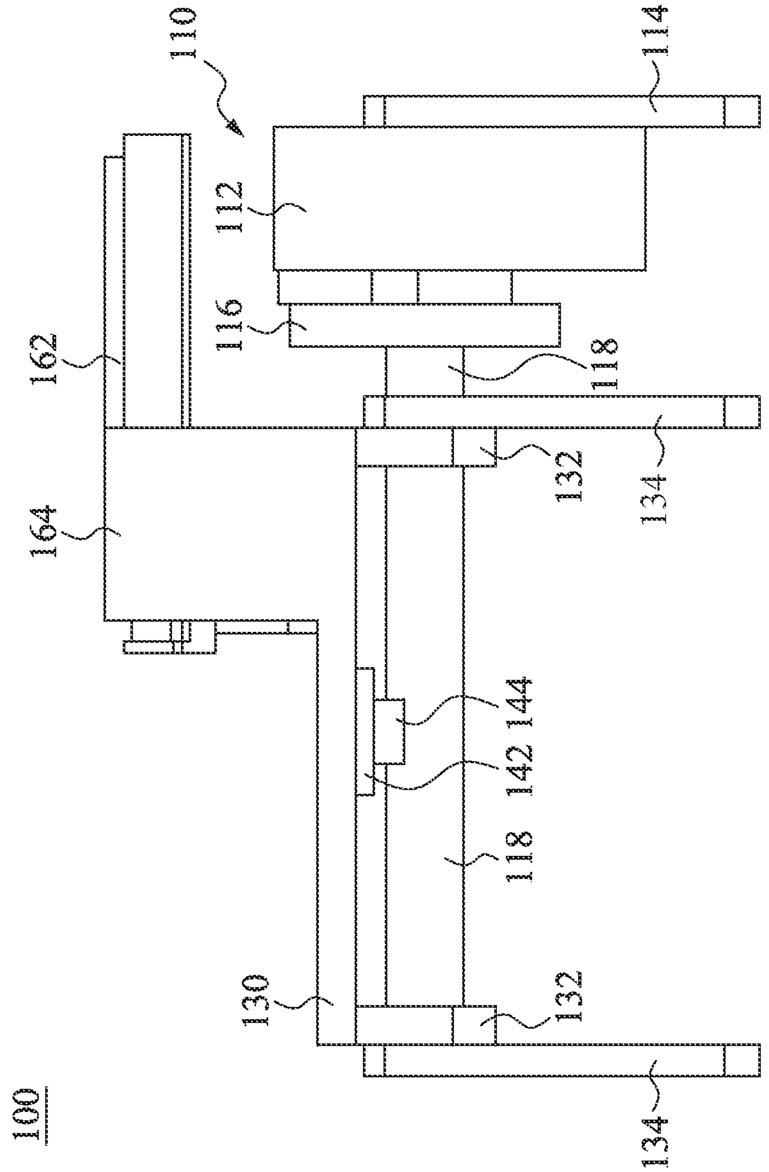
FIG. 2 is an elevation view illustrating the incubation device in FIG. 1 in accordance with an embodiment of the instant disclosure.

Attention is now invited to FIG. 2. The actuator 110 includes a shaft 118 that is connected to the motion disc 116. The shaft 118 is secured to the motion disc 116 by fastener and protrudes away from the motion disc 116. In some embodiments, the shaft 118 is arranged substantially perpendicular to the plane of the motion disc 116 as shown in FIG. 2. The engagement between the shaft 118 and the motion disc 116 allows the movement of the motion disc 116 to be transmitted to the shaft 118. For example, when the motion disc 116 goes anti-clockwise, the shaft 118 follows the course of the motion disc 116.

Referring back to FIG. 1, the platform 130 is a board that may have a planar surface. The platform 130 is made of a thermal insulating material, for example, glass, polystyrene, polyurethane (PU), and polyoxymethylene (POM). The platform 130 has a thermal conductivity ranging between about 0.02 and 3 $Wm^{-1}K^{-1}$. In some embodiments, the platform 130 is in a shape of rectangle, and any other geometric configurations may be applicable. The platform 130 has downwardly extending flanges 132 on its back side. The flanges 132 are formed with receiving through holes (not shown). The receiving through holes serve to retain the shaft 118 as shown in FIG. 1. The platform support legs 134 are formed with receiving through holes 136 for receiving the shaft 118.

Referring to FIG. 2, when assembled, the receiving through holes 136 of the platform support legs 134 and the platform flanges 132 are aligned to receive the shaft 118. The shaft 118 goes laterally, crossing the first platform support leg 134, the first flange 132, the second flange 132 and the second platform support leg 134. The shaft 118 extends across the back side of the platform 130. The engagement between the platform support legs 134 and the shaft 118 is movable, while the engagement between the flanges 132 and the shaft 118 is fixed. In this configuration, the movement initiated from the motion disc 116 is transmitted from the shaft 118 to the flanges 132 and passed on to the platform 130. The actuator support leg 114 and the platform support legs 134 remain stationary when the actuator 110 is under operation.

Figure 3:
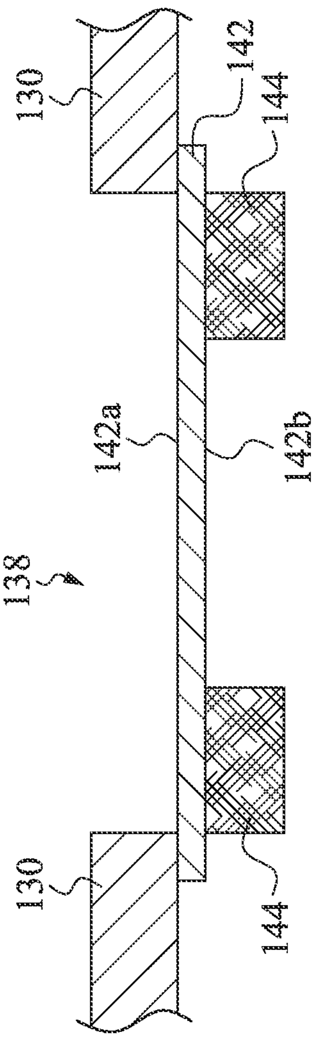
FIG. 3 is a cross-sectional view along Y-Y in FIG. 1 in accordance with an embodiment of the instant disclosure.

Referring back to FIG. 1, the platform 130 is formed with a through hole 138. The through hole 138 may be in any geometric configurations, and in some embodiments, the through hole 138 is rectangular as shown in FIG. 1. One end of the through hole 138 is sealed by a thermal conductive plate 142. Attention is now is invited to FIG. 3, illustrating a cross-sectional view of the incubation device 100 obtained from a vertical plane crossing Y-Y in FIG. 1. The thermal conductive plate 142 is mounted on the platform 130 through, for example, fasteners. The front side 142$a$ of the thermal conductive plate 142 faces the through hole 138 and serves as the bottom of the through hole 138, while the back side 142$b$ of the thermal conductive plate 142 faces away from the through hole 138. The thermal conductive plate 142 may be slightly larger than the opening of the through hole 138 in terms of surface area as shown in FIG. 3. Alternatively, the thermal conductive plate 142 may be fit to the opening of the through hole 138. One end of the through hole 138 is tightly closed by the thermal conductive plate 142. The thermal conductive plate 142 is made of materials exhibiting good thermal conductivity, for example, graphene, copper and aluminium. The thermal conductive plate 142 has a thermal conductivity larger than at least 10 $Wm^{-1}K^{-1}$. The thermal conductivity of the thermal conductive plate 142 is much greater than the thermal conductive of the platform 130. For example, if the platform 130 has a thermal conductivity of about 0.1 $Wm^{-1}K^{-1}$ and the thermal conductive plate 142 may have a thermal conductivity of about 200 $Wm^{-1}K^{-1}$.

Still referring to FIG. 3, a temperature control unit 144 is disposed on the thermal conductive plate 142. The temperature control unit 144 may be a heating and a cooling unit that is able to increase or decrease the temperature of the thermal conductive plate 142. The temperature control unit 144 is mounted directly on the thermal conductive plate 142. In some embodiments, the temperature control unit 144 is disposed on the back side 142$b$ of the thermal conductive plate 142. The temperature control unit 144 is suspended under the platform 130. The temperature control unit 144 is not in contact with the platform 130 main body but the thermal conductive plate 142.

Figure 4:
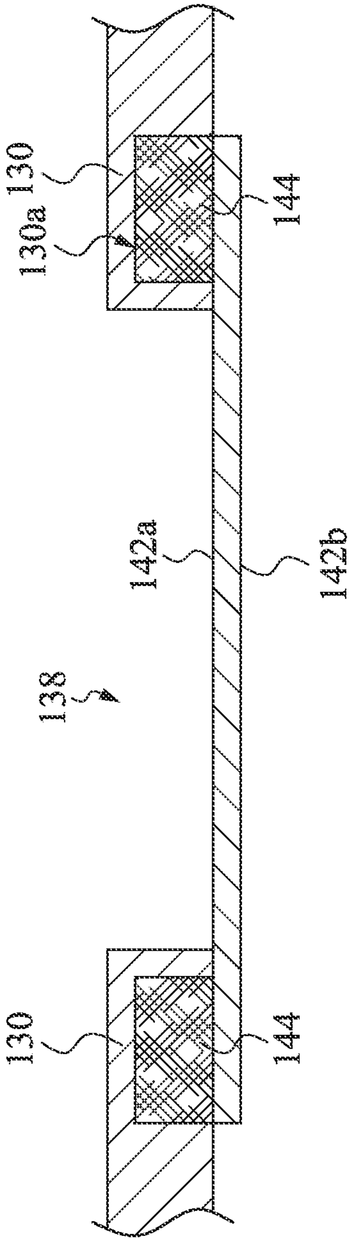
FIG. 4 is a cross-sectional view along Y-Y in FIG. 1 in accordance with an embodiment of the instant disclosure.

Alternatively, as shown in FIG. 4, which is a cross-sectional view of the incubation device 100 obtained from a vertical plane crossing Y-Y in FIG. 1, the temperature control unit 144 is disposed on the front side 142$a$ of the thermal conductive plate 142. In the case when the temperature control unit 144 is mounted on the front side 142$a$ of the thermal conductive plate 142, the thermal conductive plate 142 is much larger than the opening of the through hole 138, and the platform 130 is thinner and formed with an indentation (recess) at the back side for accommodating the temperature control unit 144. The temperature control unit 144 is therefore surrounded by the thermal insulating platform 130 and in contact with the thermal conductive plate 142. This arrangement allows better thermal insulation because the radiation from the temperature control unit 144 is transmitted through the direct contact with the thermal conductive plate 142, and the rest is shielded by the platform 130. The thermal insulating platform 130 helps to minimize heat dissipation of the temperature control unit 144.

The shape of the temperature control unit 144 may adapt any other configurations. For example, the temperature control unit 144 may be elongated strip that goes across the thermal conductive plate 142. The quantity of the temperature control unit 144 may be more than one. The temperature control unit 144 may be a resistive heater, a thermoelectric cooler (TEC) together with cooling fans, or circulation of heated and cooled water or a combination thereof. The temperature control unit 144 may be disposed on the edge of the thermal conductive plate 142 or at a central portion of the thermal conductive plate 142, and the instant disclosure is not limited thereto.

Referring back to FIG. 1, the incubation lid 152 is movably arranged over the platform 130. The incubation device 100 includes a rack 160 disposed on the platform 130. In some embodiments, the rack 160 has a main body 162, and the main body 162 stands on the platform 130 on two legs 164. A space is created between the main body 162 and the platform 130. A track mechanism 168 is mounted on the main body 162 of the rack 160. The track mechanism 168 is capable of moving back and forth. In other words, the track mechanism 168 moves in a direction toward the through hole 138 of the platform 130 or withdrawing to the opposite direction. The incubation lid 152 is mounted on the track system 168 which takes the incubation lid 152 travelling across the platform 130. Edges of the incubation lid 152 are in contact with the surface of the platform 130. The incubation lid 152 slides over the platform 130 when it travels. The incubation lid 152 may be made of the same thermal insulating material as the platform 130. In an alternative embodiment, the incubation lid 152 is made of a different material from the platform 130 but still has a thermal conductivity much smaller than that of the thermal conductive plate 142.

In some embodiments, the incubation lid 152 is made of transparent materials that allows radio signals having a predetermined wavelength to pass through the incubation lid 152.

Figure 5:
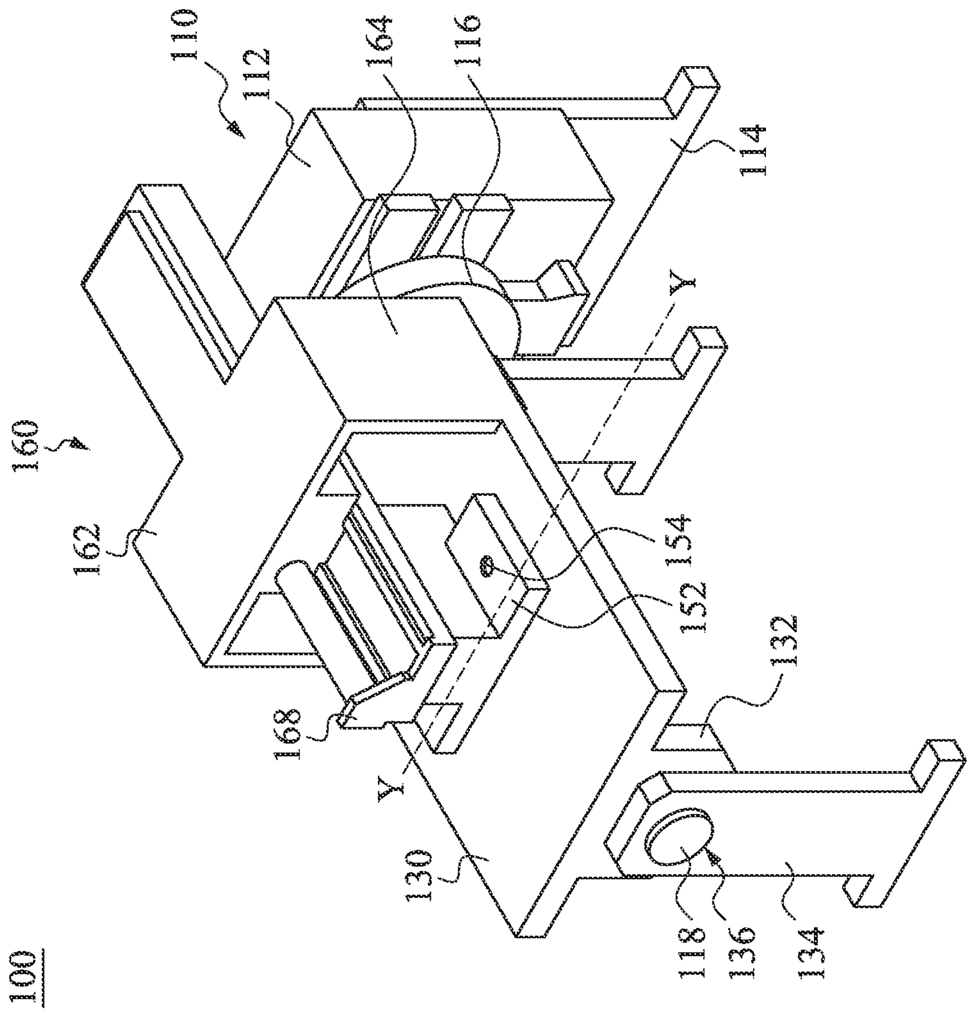
FIG. 5 is a perspective view illustrating an incubation device in accordance with an embodiment of the instant disclosure.

Attention is now invited to FIG. 5. When the track system 168 stretches forward towards the through hole 138 of the platform 130, the incubation lid 152 is taken along the course and smoothly sweeps across the surface of the platform 130. The track system 168 may extends to a degree that at least allows the incubation lid 152 completely covers up the through hole 138. The through hole 138 is sealed by the thermal conductive plate 142 from one end, while the other end of the through hole 138 is fully covered by the incubation lid 152. The shape of the through hole 138 and the incubation lid 152 may be different as long as the coverage of the incubation lid 152 can fully hide the through hole 138 from view. In some embodiments, as shown in FIG. 5, the incubation lid 152 has an opening 154. The opening 154 may be a through hole that goes through the incubation lid 152 so as to allow foreign particle entry, or in some cases removal, from the spaces in between the incubation lid 152 and the thermal conductive plate 142. In some embodiments, the opening 154 is a valve that can be closed or opened depends on required reaction conditions in the space collectively defined by the incubation lid 152 and the thermal conductive plate 142.

Figure 6:
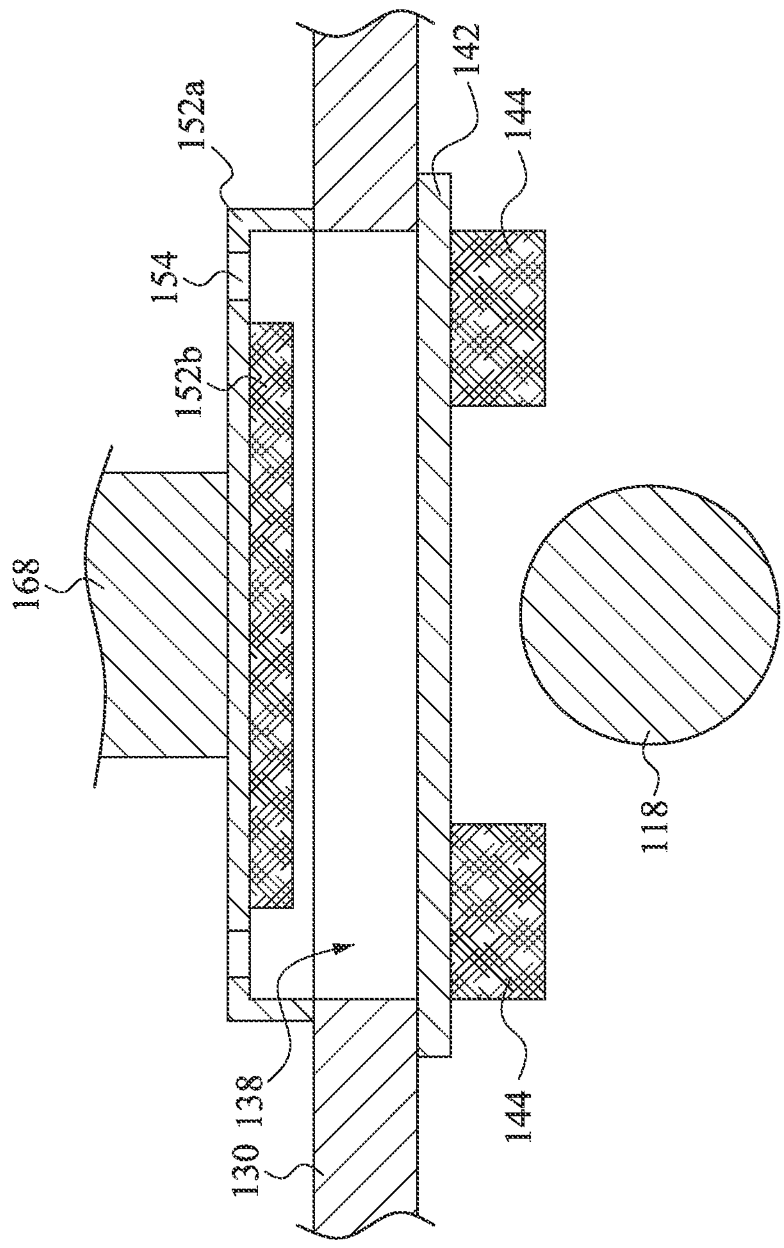
FIG. 6 is a cross-sectional view along Y-Y in FIG. 5 in accordance with an embodiment of the instant disclosure.

Attention is now invited to FIG. 6. FIG. 6 illustrates a cross-sectional view of the incubation device 100 obtained from a vertical plane crossing Y-Y in FIG. 5. For the sake of clarity, only selected elements are shown in the diagram. The incubation lid 152 includes a shield **152*a* which is made of a thermal insulating material similar to the platform 130. The shield 152*a* may resemble an inverted bowl and has a depth that adds the height to the through hole 138 as shown in FIG. 6. In some embodiments, the shield 152*a* just closes atop the sidewalls of the through hole 138 without increasing the dimension of the closed through hole 138. Inside the shield 152*a*, a lid thermal temperature control unit 152*b* is mounted on the inner surface of the shield 152*a*. When the incubation lid 152 closes the through hole 138, the lid thermal temperature control unit 152*b* is contained in the through hole 138. The through hole 138 is now a sealed space for accommodating, for example, reaction vessels. When the temperature control unit 144 and the lid temperature control unit 152*b* are under operation, the air in the through hole 138 may be heated up or cooled down depending on the predetermined temperature control. The temperature control unit 144 and the lid temperature control unit 152*b* may be working at the same time, or one is on and the other is off. In some embodiments, the lid temperature control unit 152*b* may be omitted. The opening 154 on the shield 152*a* allows gas and fluid communication with the through hole 138**.

Figure 7:
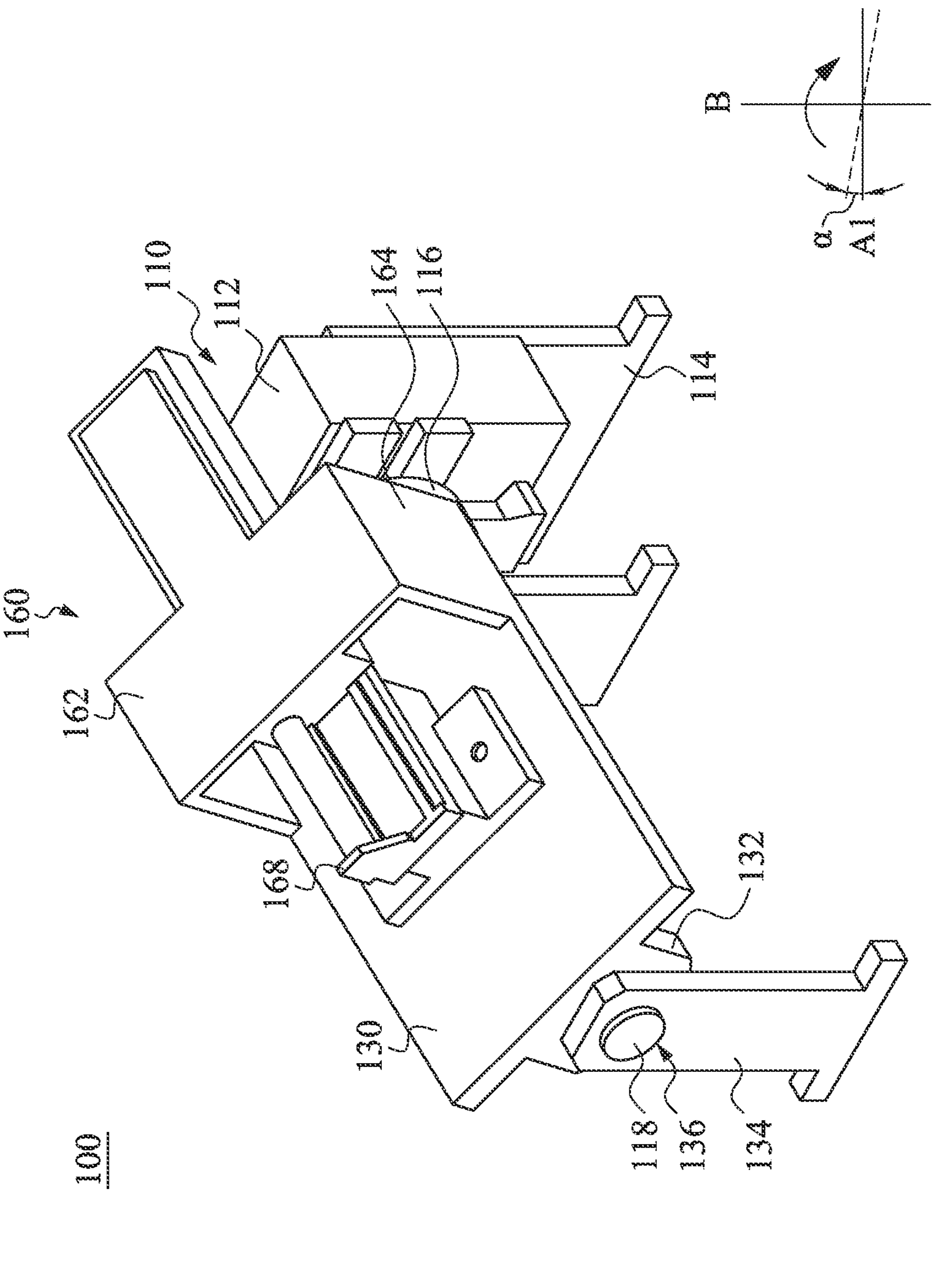
FIG. 7 is an elevation view illustrating the incubation device in FIG. 5 in accordance with an embodiment of the instant disclosure.

Attention is now invited to FIG. 7. When the actuator 110 is under operation, the platform 130 tilts an angle $\alpha$ with respect to a base level A1 shown in FIG. 7. The base level A1 is the position of the platform 130 when the actuator 110 is at rest. Once the actuator 110 is activated, for example, going clockwise, the movement from the motion disc 116 is then transmitted by the shaft 118 to the platform 130. The platform 130 therefore goes clockwise as the motion disc 116. When the motion disc 116 goes anti-clockwise, the platform 130 is drawn along the course. The incubation lid 152 also follows the movement generated by the actuator 110 and keeps the through hole 138 airtight during the swing. The frequency and degrees of swing of the motion disc 116 may be controlled by an actuator control unit (not shown).

Figure 8:
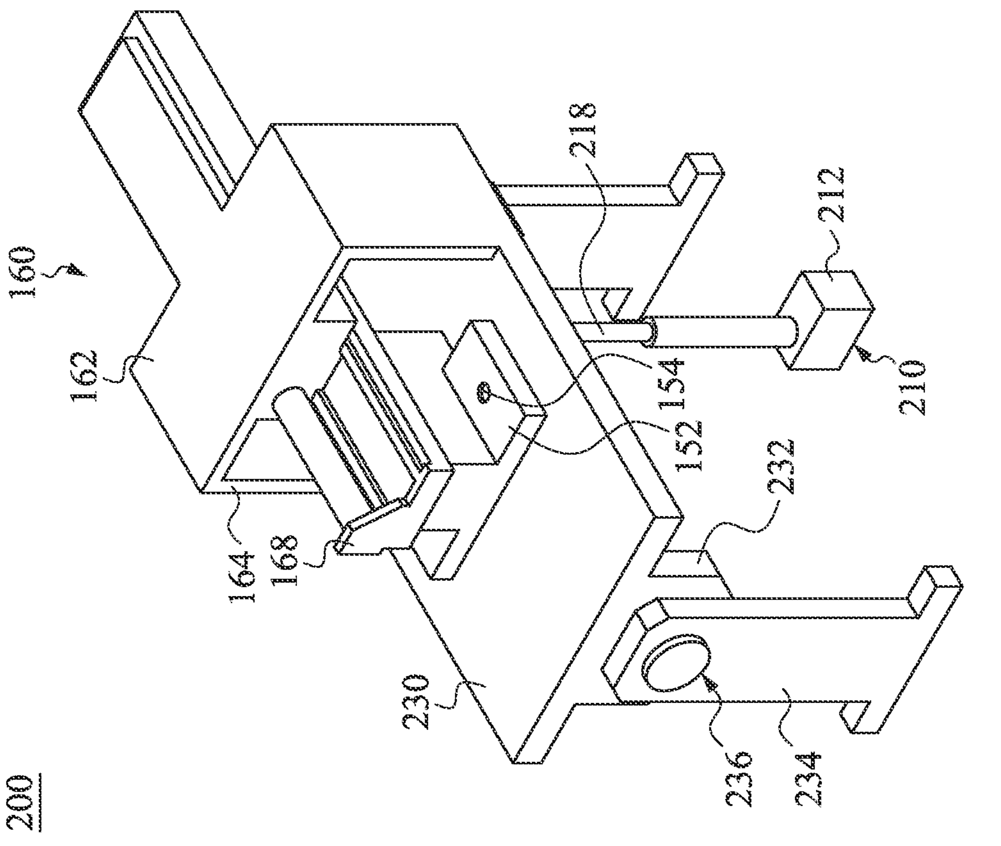
FIG. 8 is a perspective view illustrating an incubation system in accordance with an embodiment of the instant disclosure.

Attention is now invited to FIG. 8, illustrating another embodiment of the incubation device 200. The incubation device 200 is similar to the incubation device 100, and the difference arises from the actuator 210. The incubation device 200 includes the actuator 210, the platform 230 and the incubation lid 152. Unlike the actuator 110, the actuator 210 has a hydraulic system 212, and one terminal of the shaft 218 is connected to the hydraulic cylinder. The other terminal of the shaft 218 is connected to the platform 230. The platform 230 is engaged to the platform support legs 234 in a movable manner so as to allow the platform 230 to swing. In some embodiments, the flange 232 of the platform 230 has a pivot 236 that is received by the platform support legs 234.

Still referring to FIG. 8. The hydraulic system 212 creates movement in an up and down fashion. The shaft 218 is pushed out of the bore and retreating back to the bore, as the hydraulic cylinder goes up and down. The movement of the shaft 218 and causes a swing movement to the platform 230 similar to the one generated by the actuator 110.

Figure 9A:
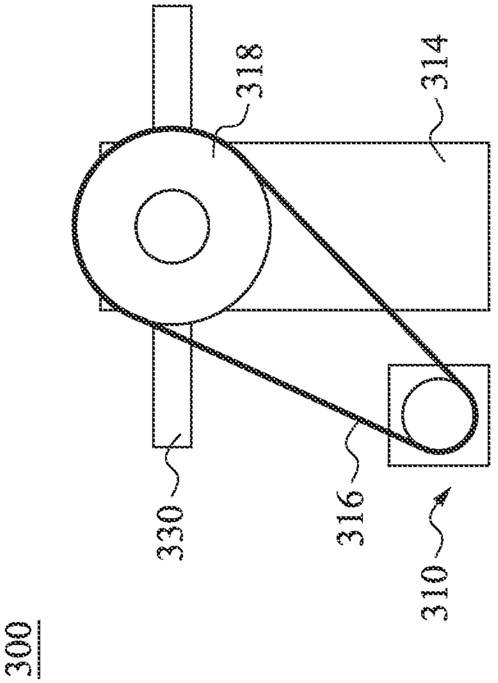
FIGS. 9A and 9B are elevation views illustrating an incubation system in accordance with an embodiment of the instant disclosure.
Figure 9B:
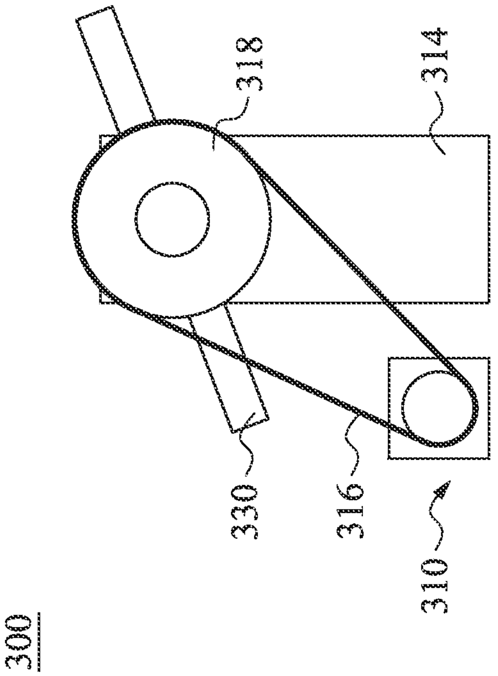

Attention is now invited to FIGS. 9A and 9B, illustrating an elevation view of another embodiment of the incubation device 300. The incubation device 300 is similar to the incubation device 100, and the difference arises from the actuator 310. The actuator 310 includes a belt 316. As shown in FIG. 9A, the belt 316 forms a loop between the actuator 310 and the shaft 318. The platform 330 is at a rest state on the platform support legs 314 When the actuator 310 activates, the belt 316 spins and brings the shaft 318 into a rotation. As shown in FIG. 9B, the shaft 318 transmits the rotation movement to the platform 330, and the platform 330 swings.

Figure 10:
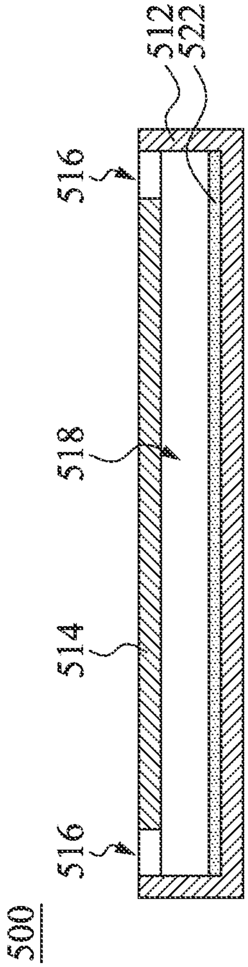
FIG. 10 is a cross-sectional view illustrating a flow cell in accordance with an embodiment of the instant disclosure.

Attention is now invited to FIG. 10, illustrating a cross-sectional view of a flow cell 500. The incubation device 100 may further include the flow cell 500. The flow cell 500 has a housing 512 serving as a container that defines a chamber 518 by its boundary. The chamber 518 may accommodate biological and chemical analytes (not shown). The housing 512 is closed by a visibly transparent window 514, covering a top portion of the chamber 518. When analytes are placed in the chamber 518, reaction conditions inside the housing 512 can be observed through the window 514. Portions of the window 514 define a port 516. The port 516 allows admission and discharge of fluid or other particles into or out of the chamber 518. The housing 512 may adapt to any geometric configuration, for example, oval, square, or the like. The flow cell 500 may include a substrate 522 disposed on the bottom of the chamber 518. The substrate 522 may include fluorescence material. The fluorescence material may react with certain molecules and become an indicator when the chemical or biological reaction takes place. The fluorescence signal may escape from the visibly transparent window 514. Examples of the substrate 522 can be glass, quartz, and silicon.

Figure 11:
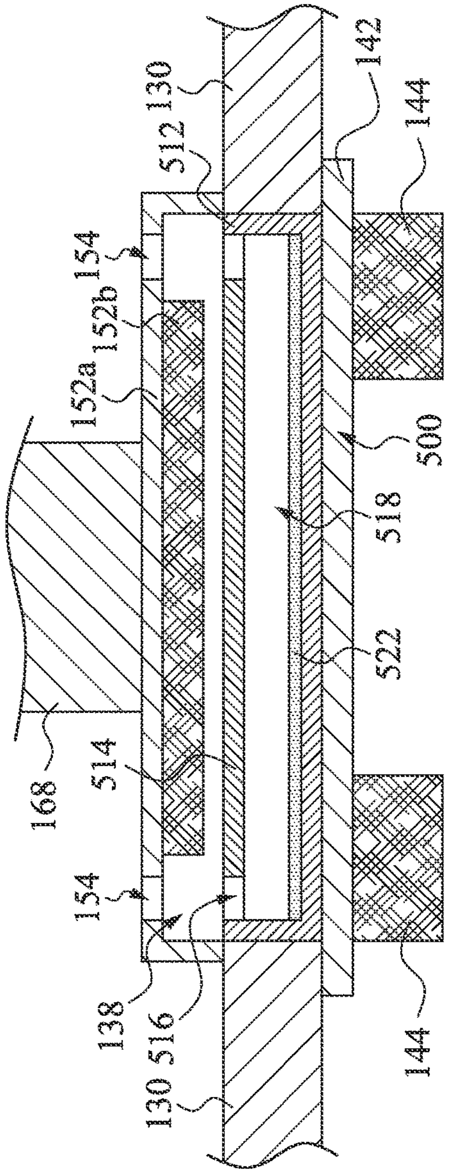
FIG. 11 is a cross-sectional view illustrating a flow cell placed on an incubation device in accordance with an embodiment of the instant disclosure.

Attention is now invited to FIG. 11. The flow cell 500 is received by the platform 130 in the through hole 138. In some embodiments, the housing 512 is a rectangular block that tightly fits into the through hole 138 as shown in FIG. 10. The flow cell 500 is disposed on the thermal conductive plate 142. The front side 142*a* of the thermal conductive plate 142 is in contact with the bottom of the housing 512. The flow cell 500 sits on the thermal conductive plate 142, and the incubation lid 152 covers up the through hole 138 which accommodates the flow cell 500. In some embodiments, the housing 512 may have a different configuration from the through hole 138, and the sidewalls of the housing 512 will not be in contact with the platform 130. In some embodiments, more than one flow cell 500 may be placed on the thermal conductive plate 142. The height of the flow cell 500, which is measured from the bottom of the housing 512 to the window 514, should not exceed the height of the through hole 138 such that the incubation lid 152 does not crash the top portion of the flow cell 500 when the incubation lid 152 travels across the platform 130. When the flow cell 500 is confined in the through hole 138, the opening 154 of the incubation lid 152 is aligned with the port 516 of the flow cell 500. In this alignment, materials can be admitted into or discharged from the chamber 518 of the flow cell 500.

Still referring to FIG. 11, in the case when the opening 154 is a valve and the opening 154 can be shut, the through hole 138 of the platform 130 is sealed from the top by the incubation lid 152. The flow cell 500 inside the through hole 138 is in an airtight condition to prevent liquid evaporation. In the case which a high temperature is desired, the temperature control unit 144 is heated up, and the heat is transmitted to the thermal conductive plate 142. The heat is then passed on to the flow cell 500 through direct contact with the thermal conductive plate 142. At the same time, the heat is retained in the through hole 138 because the platform 130 and the incubation lid 152 are made of thermal insulating material, and the desired temperature can be easily achieved and maintained. In addition, the lid temperature control unit 152*b* helps to maintain the temperature in the closed space.

Fluid can be introduced into the flow cell 500 from the opening 154 through to the port 516. Some bubbles may be present in the fluid contained in the flow cell 500. When the platform 130 swings according to the motion disc 116, due to gravity, the fluid and bubbles travel in opposite directions. That is, the bubbles can be exhausted from the port 516 and released out of the chamber 518 and further out of the through hole 138 through the opening 154.

Figure 12:
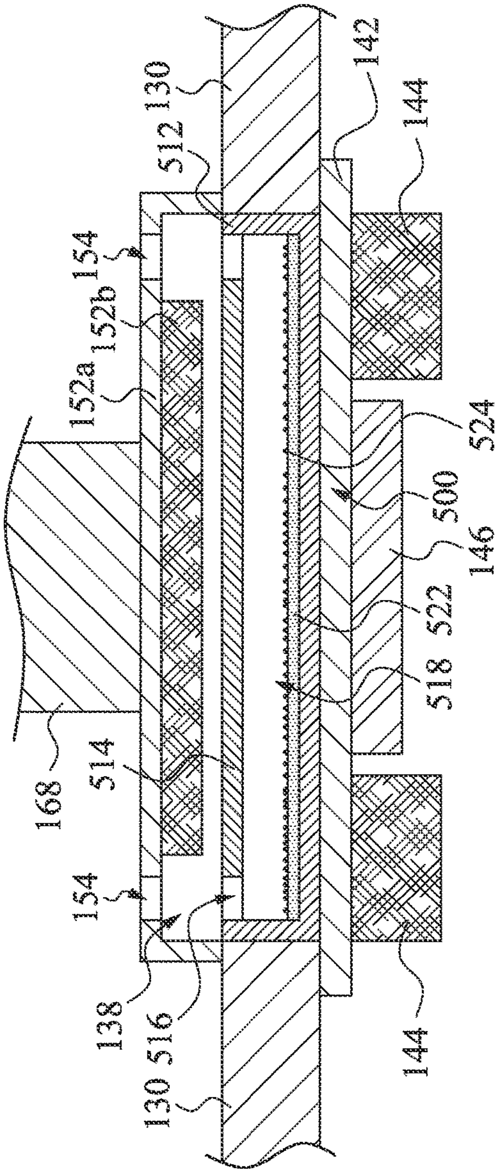
FIG. 12 is a cross-sectional view illustrating a flow cell placed on an incubation device resting state tiling to an angle in accordance with an embodiment of the instant disclosure.

Attention is now invited to FIG. 12, illustrating another embodiment of the incubation device. In this embodiment, the flow cell 500 further includes the magnetic microparticles 524. The size of these magnetic microparticles 524 ranges from less than 1 micron (μm) to 100 micron, preferably less than 30, and more preferably between 1 to 10 micron. The surface of the magnetic microparticle may be covered by materials such as silica, polystyrene or the like. The incubation device 100 further includes a magnetic member 146 that is disposed on the back side 142*b* of the thermal conductive plate 142. The magnetic member 146 may apply a magnetic field to the flow cell 500 through the thermal conductive plate 142, and the positions of the magnetic microparticles 524 can be controlled by the magnetic field generated by the magnetic member 146. For example, the magnetic microparticles 524 may be herded into a corner of the chamber 518. The magnetic member 146 may have a similar coverage as the substrate 522 in the chamber 518. In some embodiments, the magnetic member 146 includes a permanent magnet.

Figure 13:
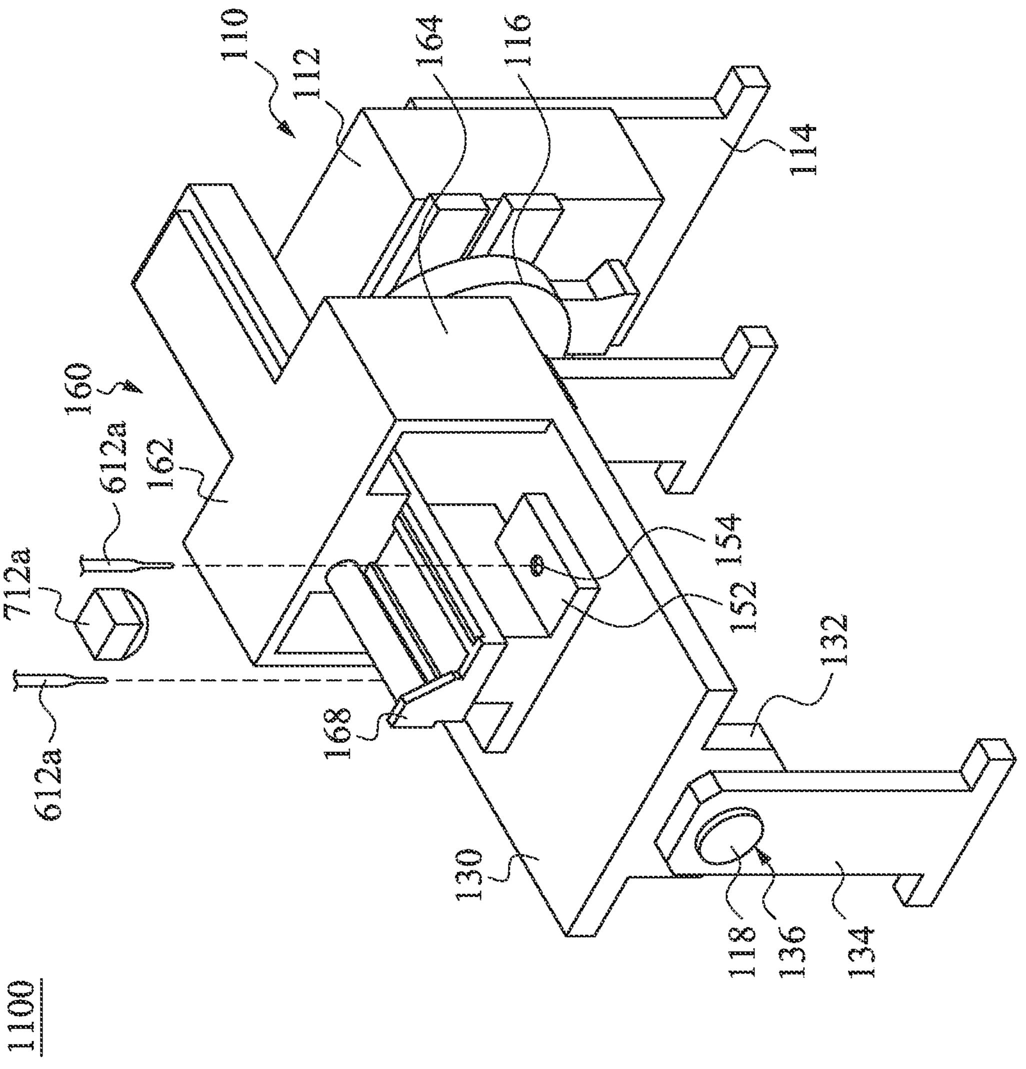
FIG. 13 is a cross-sectional view illustrating a flow cell placed on an incubation device in accordance with an embodiment of the instant disclosure.

Attention is now invited to FIG. 13, illustrating an incubation system 1100. The incubation system 1100 includes the incubation device 100 and a fluid control unit. Only portions of the fluid control unit are shown in FIG. 13. The fluid control unit includes a dispenser 612*a*. The dispenser 612*a* is provided with, for example, analytes or solution. The dispenser 612*a* is in fluid communication with the incubation device 100. For the sake of clarity, only the dispenser 612*a* is shown in FIG. 13. The dispenser 612*a* is aligned to the opening 154. When fluid is pumped to the dispenser 612*a*, the fluid passes through the opening 154 and enters the chamber 518 through the port 516. The dispenser 612*a* may be tilted along with the incubation device 100 if needed. Still referring to FIG. 13, the incubation system 1100 may further include a detection unit 712*a*, having light emitting elements and receiving elements (not shown). The light emitting element of the detection unit 712*a* may include a light-emitting diode (LED). In some embodiments, the detection unit 712*a* is hanged over the incubation lid 152 as shown in FIG. 13 because the incubation lid 152 is made of transparent materials. Radiation from the detection unit 712*a* having a predetermined wavelength may be admitted through the incubation lid 152 and passes to the chamber 518. Specific chemical and biological analytes may response to the radiation and their signals go through the incubation lid 152 and are picked up by a receiving element in the detection unit 712*a*.

Figure 14:
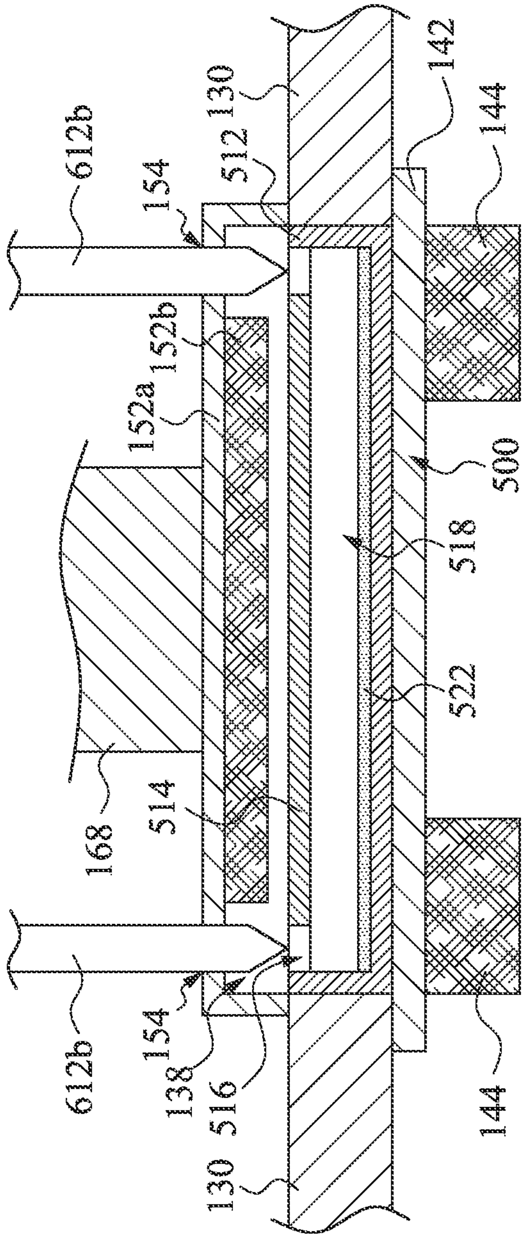
FIG. 14 is a cross-sectional view illustrating a flow cell placed on an incubation device in accordance with an embodiment of the instant disclosure.

Attention is now invited to FIG. 14. In some embodiments, the dispenser 612*b* are attached to the incubation lid 152. The dispenser 612*b* points toward the opening 154 and is aligned with the port 516, and fluid can be admitted into the chamber 518. It is understood that, the dispenser 612*b* is still in connection with the fluid control unit of the incubation system 1100 through, for example, longer hose. In the case which the dispenser 612*b* is fixed with the incubation lid 152, the incubation lid 152 is capable of both sliding along the platform 130 and moving perpendicular to the platform 130 in order to provide a proper seal of the port 516 of the chamber 518 by the dispenser 612.

Figure 15A:
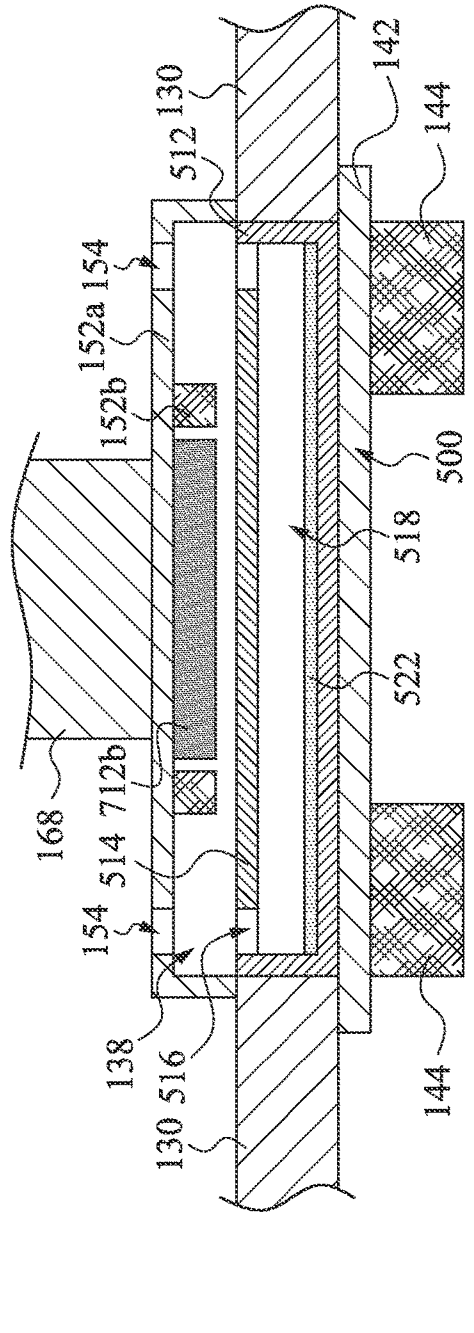
FIGS. 15A and 15B are cross-sectional views illustrating a flow cell placed on an incubation device in accordance with an embodiment of the instant disclosure.

Attention is now invited to FIG. 15A, illustrating another embodiment of the incubation system. In some embodiments, the incubation lid 152 is not made of transparent materials, and the detection unit 712*b* is attached to the inner surface of the incubation lid 152. As shown in FIG. 15A, the detection unit 712*b* hangs over the window 514 of the flow cell 500. The lid temperature control unit 152*b* changes its configuration according to the position of the detection unit 712*b*. In some embodiments, the lid temperature control unit 152*b* is in a ring shape surrounding the detection unit 712*b*. The radiation form the detection unit 712*b* travels through the window 514, and the signals from the chamber 518 are picked up by the detection 712*b* reciprocally.

Figure 15B:
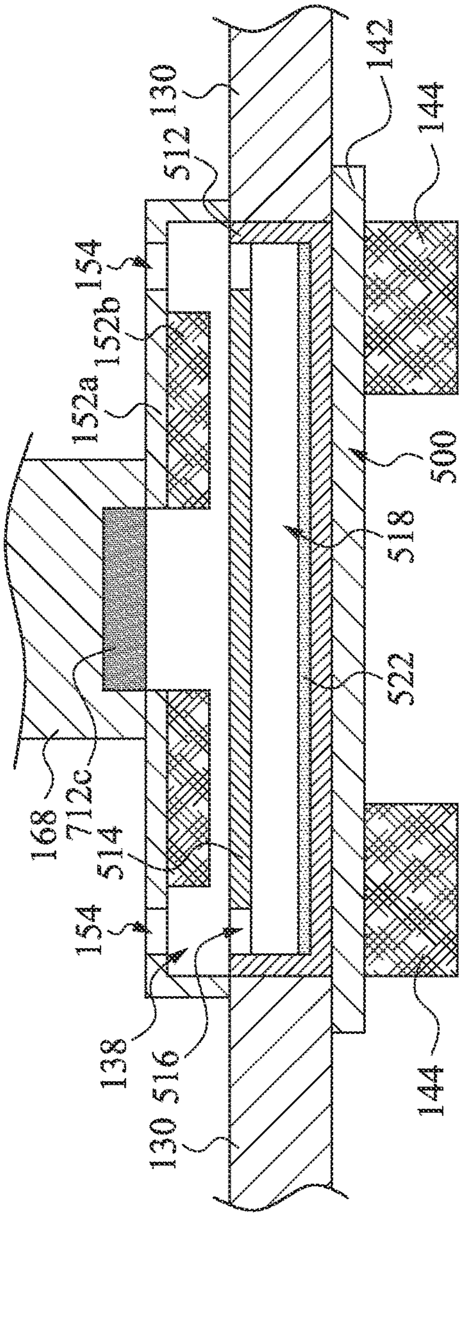

Attention is now invited to FIG. 15B, illustrating still another embodiment of the incubation system. The detection unit 712*c* is coupled to the track mechanism 168, and a portion of the incubation lid 152 is hollowed out to allow the radiation from the detection unit 712*c* to go through. The lid temperature control unit 152*b* is split into two portions as shown in FIG. 15B.

The thermal insulating platform is used to hold the flow cell. The reaction vessel is placed on the thermal conductive plate that allows fast thermal conductivity. The temperature of the reaction vessel can be finely and precisely controlled and maintained during incubation period because the platform and the incubation lid together prevent undesired thermal transfer. The swing of the platform also ensures even reactant distribution and facilitates reaction speed.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An incubation system comprising:

a platform having a through hole and a thermal conductive plate, and one end of the through hole being sealed by the thermal conductive plate;

an actuator configured in a manner allowing movement transmission to the platform;

an incubation lid movably disposed on the platform opposite to the thermal conductive plate, the incubation lid having at least two openings; and at least two dispensers suspending over the thermal conductive plate of the platform, wherein the at least two dispensers are respectively is arranged in a manner allows fluid communication through the at least two openings, wherein the at least two dispensers are fixed with the incubation lid and respectively located through the at least two openings, the incubation lid is capable of sliding along the platform and moving perpendicular to the platform, a flow cell disposed on a front side of the thermal conductive plate and enclosed by the platform, wherein the flow cell defines a chamber and comprises a window covering a top portion of the chamber, ports are formed on the window, and the ports are respectively aligned to the at least two openings, wherein when the incubation lid moves to cover the through hole, the at least two dispensers seal the ports of the chamber, wherein one of the at least two dispensers can be an import, the other one of the at least two dispensers can be an export to allow fluid communication with the at least two dispensers.

2. The incubation system of claim 1, further comprising a detection unit and configured to receive a radiation from within the chamber.

3. The incubation system of claim 1, wherein the flow cell further comprises a substrate disposed in the chamber.

4. The incubation system of claim 3, wherein the substrate comprises fluorescence material.

5. The incubation system of claim 1, wherein the flow cell comprises a plurality of magnetic microparticles disposed in the chamber.

6. The incubation system of claim 1, further comprising a magnet unit disposed on a back side of the thermal conductive plate.

7. The incubation system of claim 1, wherein the actuator comprises:

a motion disc; and a shaft connected to the motion disc and extending away from the motion disc, wherein the platform is connected to the shaft.

8. The incubation system of claim 7, wherein the actuator further comprises an actuator housing comprising mechanical components, and the motion disc is fastened to the actuator housing.

9. The incubation system of claim 1, wherein the platform has a first thermal conductivity, the thermal conductive plate has a second thermal conductivity, and the second thermal conductivity is larger than the first thermal conductivity.

10. The incubation system of claim 9, wherein the incubation lid comprises a thermal insulating shield, the thermal insulating shield resembles an inverted bowl, and the thermal insulating shield has a third thermal conductivity substantially the same as the first thermal conductivity.

11. The incubation system of claim 10, wherein the incubation lid further comprises a lid temperature control unit mounted on an inner surface of the thermal insulating shield of the incubation lid and facing the platform.

12. The incubation system of claim 1, further comprising a temperature control unit disposed on the thermal conductive plate.

13. The incubation system of claim 1, further comprising a rack disposed on the platform, wherein the incubation lid is movably engaged to the rack.

14. The incubation system of claim 1, wherein the thermal conductive plate has a front side and a back side, and the front side of the thermal conductive plate faces toward the incubation lid, and the thermal conductive plate is larger than the through hole.

* * * * *